United States Patent [19]
Freek et al.

[11] Patent Number: 6,047,851
[45] Date of Patent: Apr. 11, 2000

[54] INJECTION BLOW MOLDED CONTAINER AND RELATED METHOD

[75] Inventors: Michael Freek, Gilford; Michael Thomas, Toronto, both of Canada

[73] Assignee: Fort James Corporation, Richmond, Va.

[21] Appl. No.: 08/957,630

[22] Filed: Oct. 24, 1997

[51] Int. Cl.⁷ .................................................. B65D 51/22
[52] U.S. Cl. ........................................ 220/780; 220/796
[58] Field of Search .................... 220/254, 269, 220/780, 796

[56] References Cited

U.S. PATENT DOCUMENTS

| | | | |
|---|---|---|---|
| 2,780,259 | 2/1957 | Nalle, Jr. | 220/780 |
| 3,128,903 | 4/1964 | Crisci | 220/780 |
| 3,739,976 | 6/1973 | MacDaniel | 220/780 |
| 3,927,820 | 12/1975 | Wagner et al. | 220/796 |
| 3,977,559 | 8/1976 | Lombardi | 220/90.4 |
| 4,042,143 | 8/1977 | Biggins | 220/780 |
| 4,738,373 | 4/1988 | DeParales | 220/254 |
| 4,856,674 | 8/1989 | Berney | 220/780 |
| 5,127,523 | 7/1992 | Herducka | 220/780 |
| 5,860,549 | 1/1999 | Allers et al. | 220/780 |

Primary Examiner—Joseph Moy
Attorney, Agent, or Firm—Finnegan, Henderson, Farabow, Garrett & Dunner, L.L.P.

[57] ABSTRACT

An injected blow molded container for use with a removable lid member is disclosed. The container has a circular base and a sidewall extending from the outer circumference of the base to the upper rim of the container. The upper rim of the container having a tapered lip that both securely attaches the lid member as well as providing for the easy removal of the lid. A method for the manufacture of the injected blow molded container having a tapered lip is also disclosed. In addition a mold assembly to be used in the manufacture of the injection blow molded containers is disclosed. The mold assembly includes a moveable core that engages with an injection mold assembly and a blow mold assembly to form the containers of the invention.

7 Claims, 4 Drawing Sheets

INJECTION BLOW MOLDED CONTAINER AND RELATED METHOD

CROSS REFERENCE TO RELATED APPLICATION(S)

This application claims priority rights under 35 U.S.C. § 119 on provisional U.K. patent application 9623451-3 filed on Nov. 8, 1996.

FIELD OF THE INVENTION

This invention relates generally to injection blow molded containers and more particularly with respect to such containers and a method of making such containers which are capable of achieving a secure and tight fit with a lid member and which containers also allow easy removal of the lid member.

BACKGROUND OF THE INVENTION

Injection blow molding processes to manufacture containers are known in the art. An example of an injection blow molding product and method is shown in U.S. Pat. No. 4,540,543 (the '543 patent). This patent describes a process and apparatus to make hollow articles using a combination of injection and blow molding technology. The '543 patent describes, among other things, a process for the high speed manufacture of thin-walled plastic drinking cups of generally known configuration.

Plastic cups made from the process disclosed in the '543 patent are popular as they can be made at high speeds on a commercial level and are relatively strong and flexible. However, they suffer from the inconvenience that once a lid member is placed on the cup to achieve a secure grip, the lid member is difficult to remove.

The difficulty in removing the lid member is caused by the shape of the lip surface with which the lid member engages. The lip surfaces of these prior art cups have square or rectangular cross sections which make the removal of the lid difficult.

In light of the foregoing, there is a need for an injection blow molded plastic container to which a lid can be securely fastened and, when necessary, easily removed.

SUMMARY OF THE INVENTION

Accordingly, the present invention is directed to an improved plastic container and a method for making such containers which allows a lid member to be secured to the container and which also allows the lid member to be easily removed from the container.

The advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purpose of the invention, as embodied and broadly described herein, the invention comprises a container for use with a removable lid member. The container has a circular base, a sidewall extending from the outer edge of the base to the upper rim of the container. The upper rim of the container has a lip with a tapered edge that facilitates the removal of the lid member.

According to another aspect, the invention concerns a method of manufacturing an injection blow molded container having a tapered lip. The method includes injecting molten plastic into a mold cavity to create a preform in the basic shape of a cup with a tapered lip. The preform is then moved to a blow mold having the shape of a cup with a tapered lip, where compressed air is used to blow and expand the preform into the final shape of the cup.

In still another aspect the invention concerns a mold assembly to be used in the manufacture of the injection blow molded container having a tapered lip. The mold assembly has a core that mates with an injection mold to form a mold cavity in the shape of a preform of a cup with a tapered lip. The core also mates with a blow mold that has the shape of a cup having a tapered lip.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

FIG. 5b is an enlarged partial detailed cross sectional view of FIG. 5a.

DETAILED DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
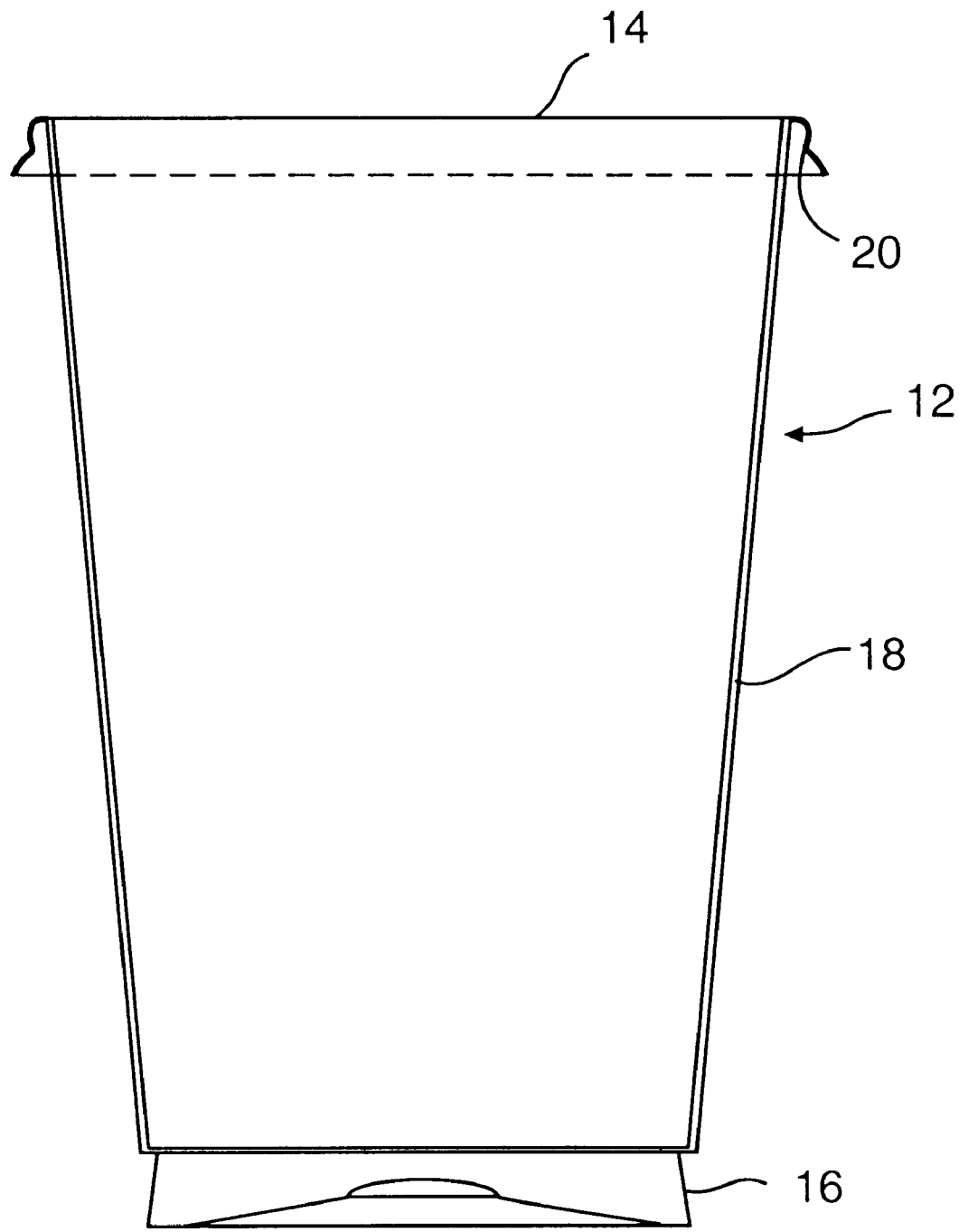
FIG. 1 is a side view illustrating a cup and a secured lid in accordance with the preferred embodiment of the invention.

FIG. 1 shows a side, cross-sectional view of a cup 12 and lid 14 in accordance with the preferred embodiment of the invention. Cup 12 has a base 16, a side-wall 18, and a lip 20. The lid 14 is shown in place on the cup 12.

It will be appreciated by those skilled in the art that cup 12 or container according to the present invention may be of any art recognized type or configuration and can be made of any art recognized material. The cup 12 may be made in any appropriate shape. In a preferred embodiment of FIG. 1, cup 12 is of a slightly tapered, truncated, inverse conical shape. In addition, the cup is preferably made of a polymer or plastic. For example, the cup can be made of polystyrene, polypropylene, polyethylene, polyethylyne terephthalate, styrene acrylonitrile, acrylic, or polycarbonate. In the preferred embodiment, the cup is made of polystyrene.

Figure 2:
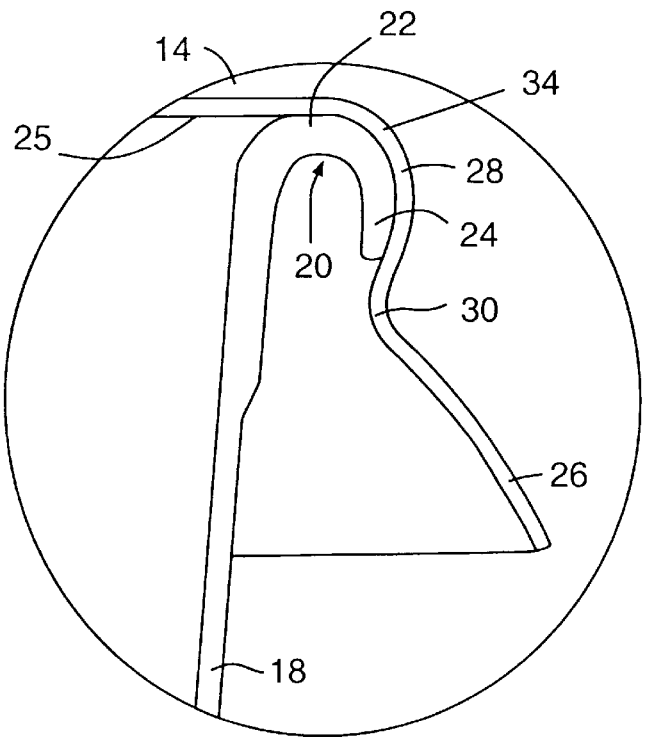
FIG. 2 is a partial cross-sectional view of the cup and lid of FIG. 1.

FIG. 2 shows a preferred embodiment of the cup 12 having the lid 14 secured on the lip 20. The lip 20 has a horizontal section 22 and a distal end 24. The outer surface of the distal end 24 is tapered towards the sidewall 18 and the inner surface of the distal end is tapered away from the sidewall. In the present embodiment, the outer surface of the distal end 24 tapers inwardly approximately 10 degrees, while the inner surface tapers outwardly approximately 7 degrees.

As FIG. 2 also shows, the lid 14 has an inner surface 25, an inner skirt 28 connected to an outer skirt 26 with an elbow 30. The lid 14 curves inwardly at the inner skirt 28 and flares outward at the elbow 30 to the outer skirt 26. When not in place on cup 12, the circle defined by the elbow portion 30 is slightly smaller in diameter than the circle defined by distal end 24 of lip 20. The lid 14 is flexible to permit elbow portion 30 to move outwardly when the lid 14 is pressed over the lip 20 of the cup 12. When in place on the cup 12, the outer surface of lip 20 forms a secure and tight grip with the inner surface of lid segment 34.

Figure 3:
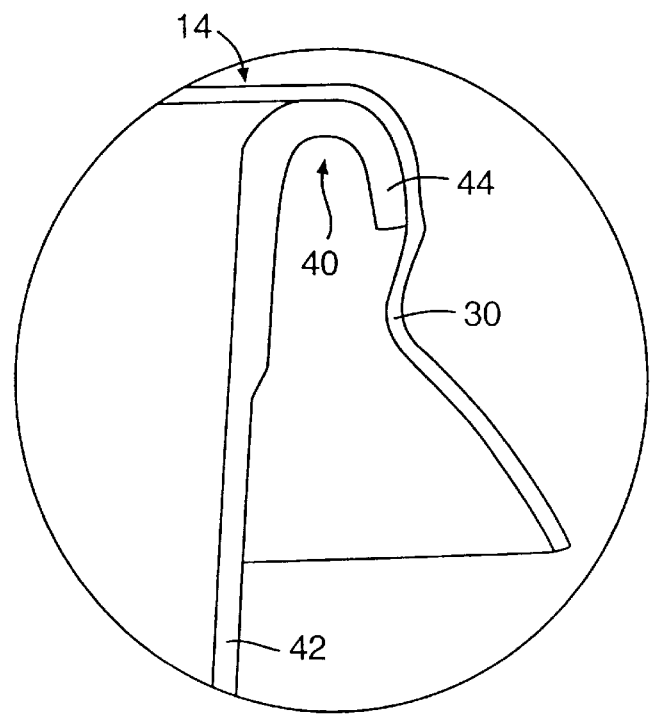
FIG. 3 is a partial cross-sectional view of a prior art cup and lid secured to the cup.

FIG. 3 illustrates the lip of prior art cups. As shown, prior art cup has a lip 40 and a sidewall 42 with the lid 14 secured on lip 40. The distal end section 44 of the lip 40 has a squared or rectangular cross-section. When the lid 14 is removed from the cup, the elbow 30 of the lid 14 catches the outer corner of the squared or rectangular cross section making it difficult to remove the lid 14. The force necessary to remove lid 14 can result in lid 14 cracking before lid 14 is removed and may result in the contents of the prior art cup being spilled.

FIG. 2 illustrates a preferred embodiment of the invention and the lid structure where the removal of the lid 14 from the cup is facilitated. The lid 14 is easily removed because of the tapered distal end 24 of the lip 20. When the distal end 24 is tapered as shown, the elbow portion 30 does not snag on the lip 20 when the lid 14 is removed. Thus, less force is required to remove the lid 14 from the cup of a preferred embodiment and the lid is less likely to crack.

It should be noted that the taper of the distal end 24 of the lip 20 does not detract from the secure attachment of the lid 14 to the cup. When the lid is in place, the flexibility and resilience of lid 14 results in frictional contact between the inner surface of lid 14 and the outer surface of lip 20. The frictional contact starts at the point where a tangent to the outer surface of lip 20 becomes substantially horizontal and continues until the lid 14 separates from the distal end 24 near the elbow 30. This frictional fit ensures that when the lid 14 is in place on the cup, the lid 14 will be securely attached to the lip 20. The taper, however, allows the lid 14 to be easily removed, when so desired.

The container of the present invention may be made by any method recognized in the art, including injection molding and injection blow molding. The preferred method of the present invention is a method of manufacturing the container through injection blow molding.

The injection blow molding process of manufacturing hollow containers involves two basic steps. First, a core assembly is engaged with an injection mold assembly to mold a preform and, second, the same core assembly is engaged with a blow molding assembly to blow and expand the preform. The lip and cup may be manufactured in the same mold or they may be manufactured in separate molds and later attached. However, the cheapest method of manufacture is to make the cup and lip in the same mold.

Figure 4:
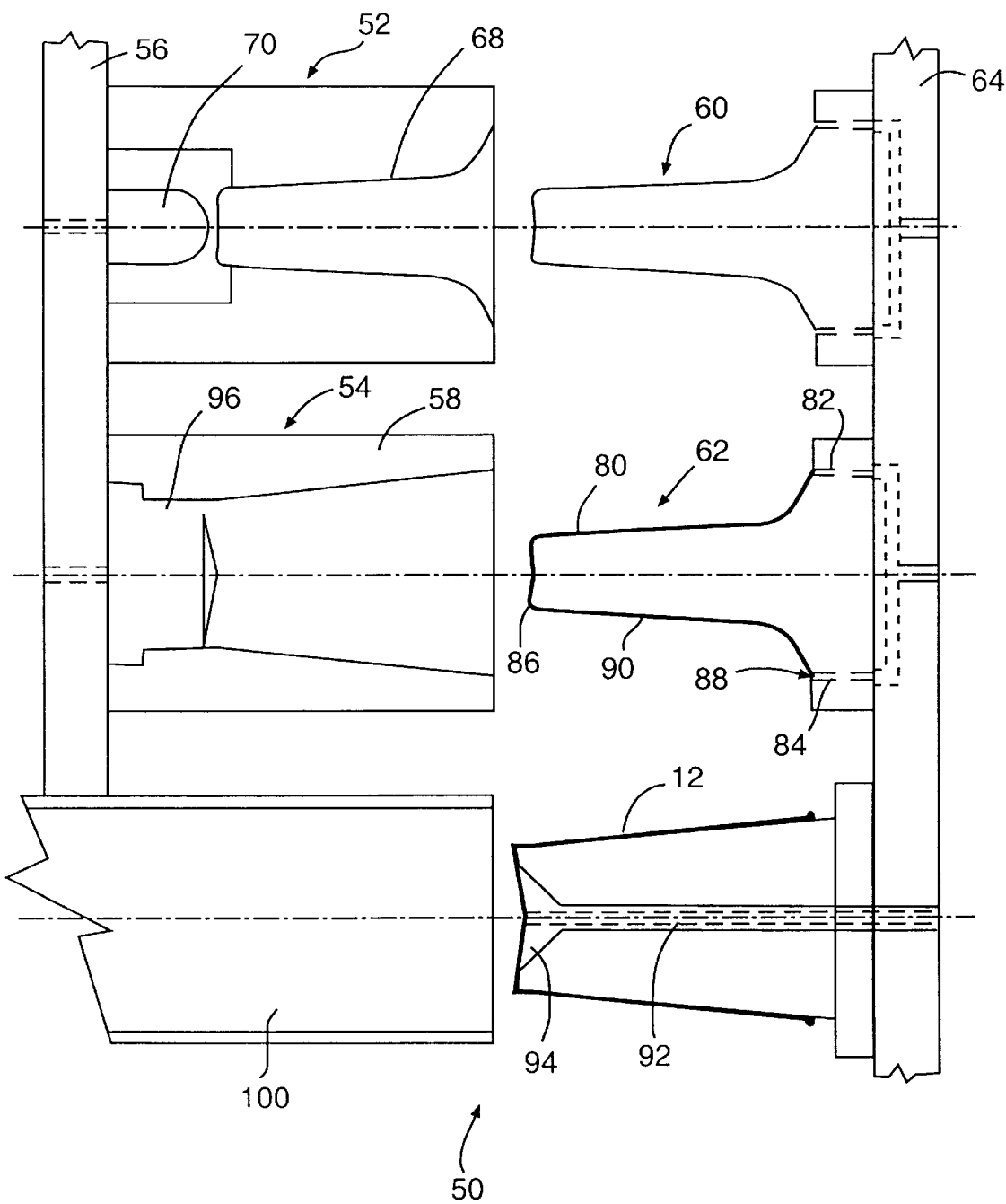
FIG. 4 in a side perspective view, illustrates an injection blow molding apparatus in an open position with core assemblies, an injection mold assembly, a blow mold assembly and an ejection station.

FIG. 4 shows in side cross-sectional view, an injection blow molding apparatus 50 arranged to produce cups of the preferred embodiment of the invention. The injection blow molding apparatus 50 has an injection mold assembly 52, a blow mold assembly 54, cores 60 and 62, a mandrel 92, and an ejection station 100.

The injection mold assembly 52 is located next to the blow mold assembly 54, both of which are attached to a fixed platen 56. The injection mold assembly includes a mold wall 68 and an injection means 70. The blow mold assembly 54 contains a blow mold 58 and a piston 96. The cores 60 and 62 contain two air passageways 82 and 84 and are securely attached to a shuttle platen 64. The shuttle platen 64 moves the cores 60 and 62 into and out of engagement with the injection mold assembly 52 and the blow mold assembly 54.

When the core 60 engages the injection mold assembly 52, a mold cavity is formed between the mold wall 68 and the core 60. Hot molten plastic can be injected into the mold cavity through the injection means 70 to mold a preform 80, an example of which is shown in FIG. 4 on core 62.

When the preform 80 has partially cooled, the core 60 is disengaged from injection mold assembly 52. The preform 80 adheres to the core 60 which is generally of a higher temperature than the injection mold assembly 52. After disengaging from the injection mold assembly 52, the shuttle platen 64 moves the core 60 and the preform 80 so as to engage with the blow mold assembly 54. After the core 62 is engaged with blow mold assembly 54, compressed air is passed through the air passageways 82 and 84 to blow and expand the preform 80 against the blow mold 58 to form the cup 12. The piston 96 helps center the preform 80 in the blow mold assembly 54.

Once the preform 80 is blown and expanded into the cup 12, the core 62 is disengaged from blow mold assembly 54 leaving the cup 12 within the blow mold assembly 54. Then, through movement of the shuttle platen 64, the mandrel 92 engages the cup 12 with a rubber suction cup 94. The piston 96 and mandrel 92 dislodge the cup from the blow mold assembly 54. The shuttle platen 64 then moves the mandrel 92 and cup 12 so as to engage an ejection station 100 where the finished cup 12 is ejected.

The shape of the finished cup 12 is governed by the shape of the preform 80 created in the injection mold assembly 52 and the shape of the blow mold assembly 54. In the preferred embodiment, both preform 80 and cup 12 have a cup-shaped configuration. The preform 80 has a preform base 86, a preform lip 88 and an outwardly flaring preform sidewall 90 extending from the preform base 86 to the preform lip 88.

Figure 5A:
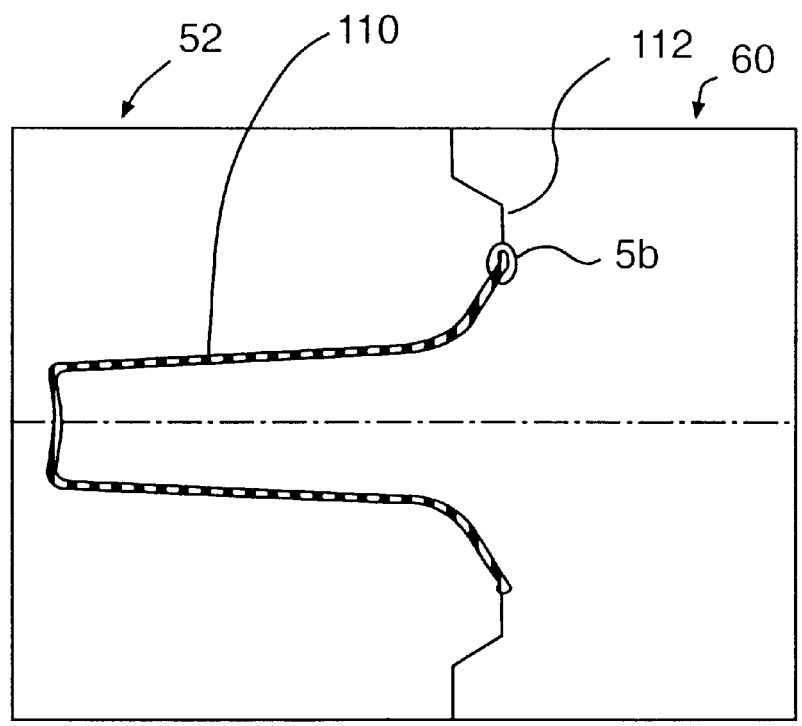
FIG. 5a is a cross sectional view of a core assembly of FIG. 4 engaged with the injection mold assembly.

FIG. 5a illustrates the engagement of the core 60 with the injection mold assembly 52 and the parting line 112 between them. The engagement forms a mold cavity 110. The first step in making the cup involves injecting hot molten plastic into the mold cavity 110. The molten plastic fills the mold cavity 110 and pushes the air to the ends of the mold cavity 110. The air exits the mold cavity through the air passageways 82 and 84 (not shown) in the core and through the parting line 112. Other vents may be placed along the boundary of mold cavity 110. However, the vents are preferably placed near the portion of the mold that forms the distal end of the lip. This placement is preferred because air under pressure will tend to rise in temperature causing hot air pockets in the molten plastic that will result in weak points in the finished cup. These weak points may cause cracks in the cup when the cup is in use. In addition, the vents should be of a dimension which will allow air to escape, but not allow the hot molten plastic to leave the mold cavity 110.

Figure 5B:
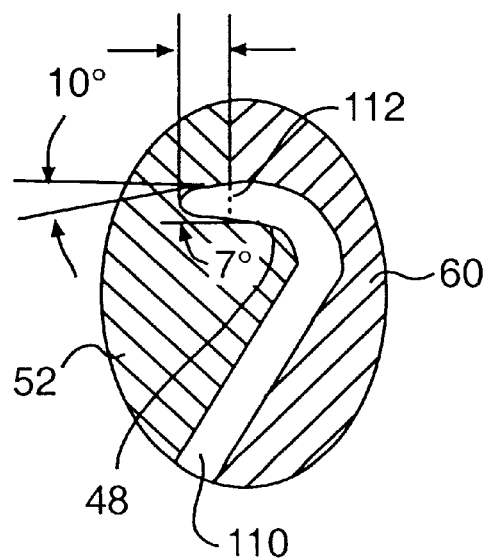

The location of the parting line 112 is critical to the successful manufacture of the cup 12. As shown in FIG. 5b, the parting line 112 intersects the shape of the lip, leaving the portion of the mold cavity 110 that forms the tapered distal edge 24 wholly within the injection mold 52. In the preferred embodiment, the parting line intersects the lip at its widest diameter, which is located 0.025 inches from the distal end of the lip. This location of the parting line prevents damage to the preform 80 when the core 60 disengages from the injection mold assembly 52. If the parting line were located more than 0.025 inches from the distal end of the lip, the outer diameter of the preform 80 would be greater than the size of the opening in the injection mold assembly 52. Thus, the disengagement of the core 60 and preform from the injection mold assembly 52 would cause the preform 80 to catch on the narrower injection mold wall and cause damage to the preform 80.

The blow mold assembly 54 faces a similar problem. The parting line 112 between the blow mold assembly 54 and the core 62 should intersect the mold cavity at the point of the widest diameter of the lip. If the parting line 112 intersected the mold cavity at a point on the inward taper of the lip, the outer diameter of the cup would be greater than the diameter of the opening on the core 62. Then, the disengagement of the core from the blow mold assembly 54 and the cup would cause the narrower core assembly to catch the lip of the cup and result in damage to the cup.

Therefore, to prevent damage to the preform or to the blown cup, the parting line 112 between the cores 60 and 62 and the injection and blow molds must intersect the mold of the cup where the lip has the greatest diameter.

The tapering of the distal portion of the lip 88 is also beneficial in that the tapering allows the preform 80 to be easily removed from the injection mold assembly 52 and the blown cup to be easily removed from the blow mold assembly 54.

It will be apparent to those skilled in the art that various modifications and variations can be made in the method of manufacture of the present invention and in construction of this injection, blow molded container without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A container for use with a removable lid member having an outer edge with an inner skirt connected to an outer skirt by an elbow portion, the container comprising:

a base forming the bottom of the container;

a sidewall, having an inner surface, an outer surface, and an upper rim, the sidewall extending upwardly from the outer edge of the base to the upper rim; and a lip disposed on the upper rim of the sidewall to frictionally engage the lid member, the lip extending radially from the upper rim and forming an inverted u-shaped section having an inner surface, an outer surface, and an outer edge, the outer surface of the u-shaped section tapering inwardly towards the inner surface proximate the outer edge of the lip, wherein the tapered edge of the lip is configured to engage the elbow portion of the lid to form a snug fit with the lid.

2. A containment system comprising:

a removable lid member, the lid member having an inner surface, an outer surface, and an outer edge, the outer edge of the lid having an inner skirt connected to an outer skirt by an elbow portion; and a container having a base forming the bottom of the container, a sidewall, having an inner surface, an outer surface, and an upper rim, the sidewall extending upwardly from the outer edge of the base to the upper rim, and a lip disposed on the upper rim of the sidewall to frictionally engage the lid member, the lip extending radially from the upper rim and forming an inverted u-shaped section having an inner surface, an outer surface, and an outer edge, the outer surface of the u-shaped section tapering inwardly towards the inner surface proximate the outer edge of the lip, wherein the elbow portion of the lid is configured to engage the tapered edge of the lip to form a snug fit with the lip.

3. The container of claim 1, wherein the container is made through the process of injection blow molding.

4. The container of claim 1, wherein the diameter of the base is smaller than the diameter of the opening formed by the rim of the sidewall.

5. The container of claim 1, wherein the base and sidewall have a circular cross-section.

6. The system of claim 2, wherein the inner surface of the u-shaped section tapers outwardly towards the outer surface proximate the outer edge of the lip.

7. The container of claim 1, wherein the inner surface of the u-shaped section tapers outwardly towards the outer surface proximate the outer edge of the lip.

* * * * *